United States Patent Office 2,931,030
Patented Mar. 29, 1960

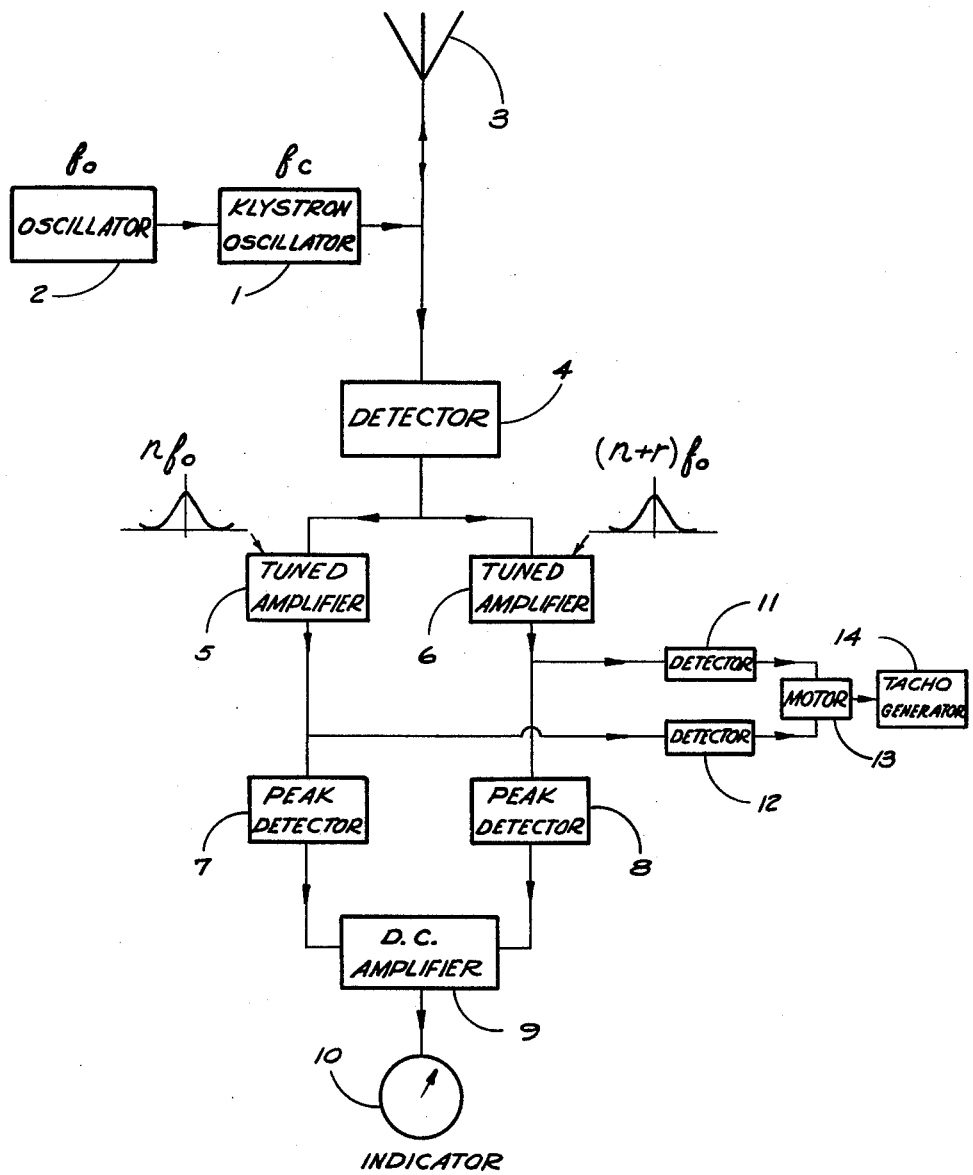

2,931,030

RADAR SYSTEM

Thomas J. Rey, Glen Burnie, Md., assignor of one-third to Leonard Bloom, Baltimore, Md.

Application September 21, 1956, Serial No. 611,295

1 Claim. (Cl. 343—14)

The present invention relates to radar systems, and more particularly, to improved frequency modulated radar systems for deriving height or range information from a distant object.

Frequency modulated radars are well known in the art. Generally, they operate on the following scheme: A frequency modulated carrier wave is radiated from an antenna and illuminates a distant target. In the case of radar altimeters, the earth constitutes the target. The illuminated target reflects part of the energy impinging upon it, and the reflected wave is received and is mixed with a portion of the transmitted wave. The transmitted wave being modulated at a linear rate, within certain limits, the instantaneously received wave is at a different frequency than the transmitted wave. When the reflected wave is mixed with a portion of the transmitted wave, a difference or beat frequency results. This beat frequency will be proportional to the delay or transmit time between the radar and the target; or in other words, it is a measure of the distance or range of the target. Present day frequency modulated radars measure this instantaneous beat frequency or else measure the average frequency as an indication of target range.

Certain classes of conventional frequency modulated radars that are used as altimeters are more fully discussed in the transactions of The Institute of Radio Engineers, volume ANE-1, No. 2, June 1954. The frequency of the carrier wave is generally in the order of 4000 megacycles, and it is necessary to use modulating frequency deviations in the order of 50 megacycles or more. The use of these large frequency deviations entails difficult circuit problems and necessitates the use of special magnetrons of the vibrating reed type.

On the other hand, if only a moderate frequency deviation is employed, the rate of zero crossings of the beat frequency (the "zero count") alters discontinuously and must be rendered continuous. For example, the reflected signal must be mixed not with a portion of the transmitted signal, but a signal derived from the latter through the introduction of an artificial Doppler effect. Difficulties arise in generating this frequency-shift effect and in eliminating the transmitted signal from the detector.

Accordingly, it is an object of the present invention to provide an improved frequency modulated radar system.

It is another object of the present invention to provide an improved frequency modulated radar system that employs a moderate frequency deviation and eliminates the need for special magnetrons of the vibrating reed type.

It is a further object of the present invention to provide an improved frequency modulated radar system that eliminates the necessity for generating an artificial Doppler or frequency-shift effect.

It is a still further object of the present invention to provide an improved frequency modulated radar system that indicates the relative sense of motion of the distant object as well as its range.

In accordance with the teachings of the present invention, two or more harmonics of the modulation frequency are selected from the autodyne beat signal, and the ratio of their amplitudes is taken as a measure of the range or height of the distant object.

According to another aspect of the present invention, the time quadrature relationship existing between the amplitude variation at Doppler period of an even and of an odd harmonic of the autodyne beat signal is used to indicate the sign of the relative speed of the distant object.

The foregoing objects, advantages, construction and operation of the present invention will become more readily apparent from the following description and accompanying drawing, in which the figure is a schematic diagram of a preferred embodiment of the present invention.

With reference to the figure, a source of high frequency oscillations 1 (which may be a klystron oscillator) generates frequency $f_c$ and is frequency modulated by a source 2 of relatively low frequency oscillations $f_0$. The ratio of the peak deviations of the output of source 1 to frequency $f_c$ is known as $m$, the index of modulation. The frequency modulated wave is radiated by antenna 3, which also serves to receive the reflected wave. However, for maximum range sensitivity, separate transmitting and receiving antennas could be used. The received signal is mixed with part of the transmitted wave in detector 4. This is shown to be coupled directly to the oscillator 1 and antenna 3 for simplicity, but other means of coupling are well-known and are equally applicable to the present invention. Detector 4 comprises a low pass filter for eliminating components whose frequencies are in the order of $f_c$ or higher; and detector 4 feeds amplifiers 5 and 6, which are tuned to frequencies $nf_0$ and $(n+r)f_0$, respectively, $n$ and $r$ being integers. If $n$ and $r$ are both equal to unity, the amplifiers 5 and 6 are tuned to frequencies $f_0$ and $2f_0$, respectively; and their bandwidths must be sufficient to pass the sidebands, which are separated by twice the highest Doppler frequency to be expected.

The outputs of the tuned amplifiers 5 and 6 are applied to peak detectors 7 and 8 and thence to a D.C. amplifier 9, whose input voltage is supplied by peak detector 7, and whose gain is controlled by peak detector 8. The output of the D.C. amplifier 9 is then a measure of the ratio of the amplitude of the output of tuned amplifier 5 to the amplitude of the output of tuned amplifier 6. Other ratio forming circuits are equally applicable to the present invention.

The signal from the D.C. amplifier 9 is proportional to the ratio of the amplitudes of the outputs of the tuned amplifiers 5 and 6; and this signal is an unambiguous and monotonically rising function of the distance to the target or reflecting surface, provided that this distance is less than a quarter the wavelength corresponding to the modulating frequency $f_0$, and provided further, that the index of frequency modulation is moderate and constant. Accordingly, this signal is applied to the indicator 10 to display the range directly or to some other device which is actuated when the distance becomes critical.

According to another aspect of the present invention, amplifiers 5 and 6 are tuned to an odd and an even harmonic of the beat frequency, respectively, and detectors 11 and 12 are provided whose time constants are short compared with the Doppler period. The outputs of detectors 11 and 12 are then at twice the Doppler frequency, but still in time quadrature, in a sense which depends on whether the reflecting surface is approaching or receding. One method to detect the sign of the relative speed is to apply the output of detectors 11 and 12 to the windings of a two-phase motor 13, whose shaft will then rotate at a rate proportional to the Doppler frequency and with the sense of the relative speed. A tacho generator 14 on the shaft of the synchronous motor 13 will then generate a voltage proportional to the relative speed in both magnitude and sign.

Another method of displaying the relative speed that is equally applicable to the present invention is to provide a differentiating or an integrating network to shift the phase of one of the detectors 11 or 12; this phase-shifted output and the output of the other detector may then be limited to the same amplitude, combined, and applied to a trigger circuit. The state of the trigger circuit is then an indication of the sign of the relative speed.

The operation of the present invention may be more clearly understood by an examination of its underlying mathematical theory. The frequency modulated wave which is being radiated at time $t$ is:

(1) $\quad v_0 = \cos(\omega_c t + m \sin \omega_0 t + \phi)$ where $a$ = amplitude of $v_0(t)$, $\frac{\omega_c}{2\pi} = f_c$ = carrier frequency, $\frac{\omega_0}{2\pi} = f_0$ = modulating frequency, $m$ = index of modulation, $\phi$ = an arbitrary phase.

The reflected signal at time $t$ is then:

(2) $\quad v_r = ab \cos\{\omega_c(t-T) + \omega_D t + m \sin \omega_0(t-T) + \phi\}$ where $b$ = a coefficient which depends on the size and distance of the reflector, $T$ = a time delay on the round trip to the reflector, $\frac{\omega_D}{2\pi}$ = Doppler frequency.

Let $H$ = the reflector distance,
$C$ = the speed of light;

then (3) $\quad T = 2H/C$ and (4) $\quad \omega_D = \omega_c \cdot \frac{1}{C} \frac{dH}{dt}$ The output of detector 4 contains the product $v_0 v_r$, and more particularly, the difference or beat term (5) $\quad v_d = k \cos\left[2m \sin \frac{\omega_0 T}{2} \cdot \cos \omega_0(t - T/2) + \omega_D t\right]$ where $k$ = an amplitude coefficient. Using a well-known expansion, (6) $\quad v_d = 2k \cos \omega_D t [\tfrac{1}{2} J_0 - J_2 \cos 2\omega_0 t'$
$\qquad\qquad + J_4 \cos 4\omega_0 t' - \ldots]$
$\qquad -2k \sin \omega_D t [J_1 \cos \omega_0 t' - J_3 \cos 3\omega_0 t' + \ldots]$ in the above, the $J_n$ are Bessel functions of the first kind and order $n$, and their argument is $2m \sin \omega_0 T/2$ for every $n$. A discussion of these Bessel functions may be found on page 160 of "Bessel Functions for Engineers" by N. W. McLaughlin, Oxford University Press, 1934. The delayed time is then (7) $\quad t' = t - T/2$ The prime will be omitted below as it has no effect. Now, the amplitude of the component of frequency $2n\omega_0/2\pi$ is (8) $\quad v_{2n} = 2k\epsilon_n \cos \omega_D t J_{2n}\left(2m \sin \frac{\omega_0 T}{2}\right)$ where $\epsilon_0 = \tfrac{1}{2}$, $\epsilon_{2n \neq 0} = 1$.

The amplitude of the component of frequency $$(2n+1)\omega_0/2\pi$$

is (9) $\quad v_{2n+1} = -2k \sin \omega_D t J_{2n+1}(2m \sin \omega_0 T/2)$

Clearly, the ratio of the amplitude of any 2 harmonics of $\omega_0$ in $v_d$ does not depend on the common amplitude coefficient $k$. For instance,

(10) $\quad \left|\frac{v_3}{v_1}\right| = \left|\frac{J_3(2m \sin \omega_0 T/2)}{J_1(2m \sin \omega_0 T/2)}\right|$ Now, $J_n(y)$ is a monotonic function of $y$ if $0 = y = j_n'$ where $j_n'$ = first non-vanishing zero of $J_n'$.

Hence the ratio $$\frac{v_{n+r}}{v_n}$$

increases monotonically with range H if

(11) $\quad (T < \tfrac{1}{2} f_0$, i.e. $H < \tfrac{1}{4}$ wavelength at $f_0$ and

(12) $\quad 2m < j_{n+r}$, $r \geq 1$, $n \geq 0$

If $$\frac{\omega_0 T}{2}$$

is small (and if Doppler modulation is smoothed out in the case of odd $r$), then

(13) $\quad v_{n+r}/v_n \doteq \frac{n!}{(n+r)!}\left(\frac{m\omega_0 T}{2}\right)^r$ Returning now to Equations 8 and 9, the Doppler modulation coefficient of the odd and even terms may be written, respectively,

(14) $\quad A_{\text{odd}} = -\sin \omega_D t$, and $A_{\text{even}} = \cos \omega_D t$ These components are orthogonal components of a vector rotating at Doppler frequency and in a sense depending on the sign of $\omega_D$ as shown in Equation 4.

If $A_{\text{odd}}$ is differentiated with respect to time and limited to some amplitude B, the fundamental component of the result is the signal

(15) $\quad V_{\text{odd}} = -B\frac{\omega_D}{|\omega_D|} \cos \omega_D t$

Moreover, if $A_{\text{even}}$ is limited to the same amplitude B, the fundamental of the result is

(16) $\quad V_{\text{even}} = B \cos \omega_D t$

Denoting the sum by $V_s$, then $$V_s = V_{\text{odd}} + V_{\text{even}} = \left(1 - \frac{\omega_D}{|\omega_D|}\right) B \cos \omega_D t$$

$= 0$ if $\omega_D$ is positive, $\neq 0$ if $\omega_D$ is negative.

Obviously, many modifications and variations of the present invention are possible in the light of the above teachings. It is therefore to be understood that within the scope of the appended claim the invention may be practiced otherwise than as specifically described.

I claim:

Frequency modulated radar apparatus for determining the range of a distant object and whether the object is approaching or receding, comprising, in combination, a first oscillator producing electromagnetic waves at a carrier frequency, a second oscillator producing electromagnetic waves at a lower modulation frequency and electrically coupled to said first oscillator so as to generate frequency modulated continuous electromagnetic waves, single antenna means electrically coupled to said first and second oscillators for radiating said frequency modulated waves and for receiving the waves reflected from the distant object, first detector means electrically coupled to said antenna means and to said first and second oscillators for mixing said reflected waves with a portion of the radiated waves, whereby an autodyne beat signal is produced, means for feeding said autodyne beat signal to a pair of parallel tuned amplifiers, one of said amplifiers being turned to an odd harmonic of the modulation frequency and the other of said amplifiers being tuned to an even harmonic of the modulation frequency, a first peak detector electrically coupled to the output of one of said tuned amplifiers, a second peak detector electrically coupled to the output of the other of said tuned amplifiers, a direct current amplifier electrically coupled between the outputs of said first and second peak detectors in such a manner whereby the output of said first peak detector supplies the input voltage of said direct current amplifier and the output of said second peak detector controls the gain of said direct current amplifier, the output of said direct current amplifier being a measure of the ratio of the amplitudes of the outputs of said pair of tuned amplifiers and hence a measure of the range of the distant object, indicating means electrically coupled to said direct current amplifier for displaying the range of the distant object, a pair of parallel detectors having time constants which are short compared to Doppler period, each of said pair of detectors being likewise electrically coupled to a respective output of one of said pair of tuned amplifiers, the outputs of said pair of detectors being at twice the Doppler frequency, but still in time quadrature, in a sense which depends on whether the distant object is approaching or receding, and separate indicating means electrically coupled to the outputs of said pair of detectors for displaying the sign of the relative speed of the distant object.

References Cited in the file of this patent

UNITED STATES PATENTS

| | | |
|---|---|---|
| 2,426,204 | Grieg | Aug. 26, 1947 |
| 2,453,169 | Varian | Nov. 9, 1948 |
| 2,558,758 | Jaynes | July 3, 1951 |